United States Patent [19]

Wydro et al.

[11] 4,405,063

[45] Sep. 20, 1983

[54] METHOD AND APPARATUS FOR CONTROLLING THE DENSITY OF DISPENSED HOT MELT THERMOPLASTIC ADHESIVE FOAM

[75] Inventors: Jan J. Wydro, Lilburn; Charles H. Scholl, Duluth; William R. Coker, Lilburn, all of Ga.

[73] Assignee: Nordson Corporation, Amherst, Ohio

[21] Appl. No.: 239,173

[22] Filed: Feb. 27, 1981

[51] Int. Cl.³ .............................................. B67D 5/34
[52] U.S. Cl. ................................ 222/146 HE; 222/55; 222/195; 261/28
[58] Field of Search .................... 68/183; 222/3, 4, 55, 222/57, 146 HE, 190, 195, 399, 638, 644; 261/28; 366/4, 5, 10

[56] References Cited

U.S. PATENT DOCUMENTS

| | | | |
|---|---|---|---|
| 3,170,599 | 2/1965 | Pianowski et al. | 222/644 |
| 3,754,417 | 8/1973 | Jamieson | 68/183 |
| 3,965,860 | 6/1976 | Cone et al. | 222/190 |
| 4,059,714 | 11/1977 | Scholl et al. | 222/146 HE |
| 4,154,537 | 5/1979 | Kress | 366/10 |

*Primary Examiner*—Joseph J. Rolla
*Assistant Examiner*—Jan Koniarek
*Attorney, Agent, or Firm*—Wood, Herron & Evans

[57] ABSTRACT

A method and apparatus are disclosed for controlling the density of dispensed hot melt thermoplastic adhesive foam in order to assure uniform foam characteristics. In order to create the hot melt adhesive foam, air or any relatively inert gas is mixed with the thermoplastic adhesive while the adhesive is in the molten state, and the mixture is then pressurized so as to force the gas into solution with the molten adhesive. As the molten adhesive/gas solution is dispensed at atmospheric pressure, the gas is released from solution and becomes entrapped in the adhesive so as to form a homogenous closed cellular adhesive foam. According to the practice of this invention, the supply of gas is periodically discontinued so as to prevent an excess volume of gas from being admixed with the molten adhesive whenever foamed adhesive is not being dispensed, thereby stabilizing the density of the adhesive foam.

19 Claims, 7 Drawing Figures

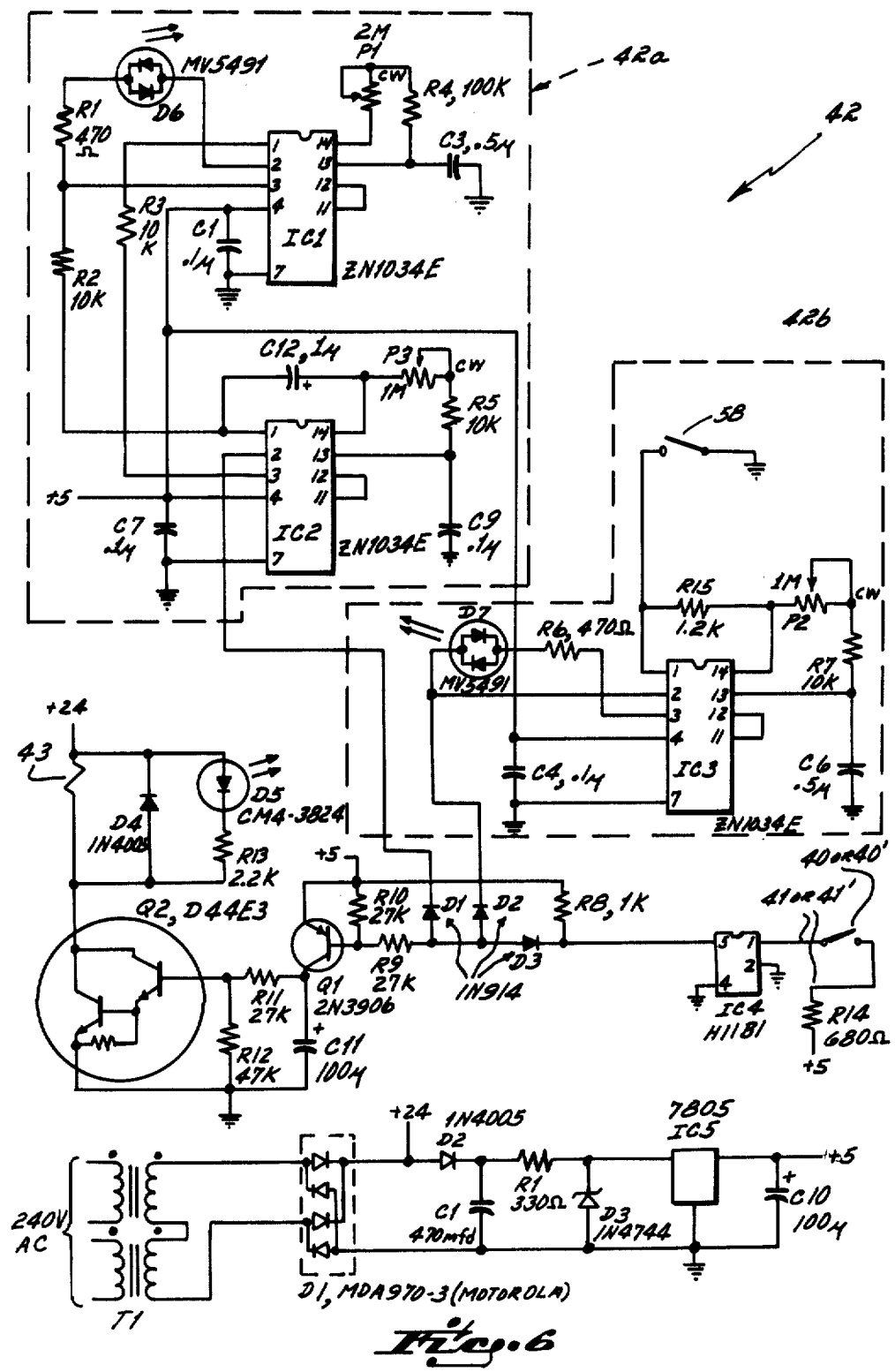

METHOD AND APPARATUS FOR CONTROLLING THE DENSITY OF DISPENSED HOT MELT THERMOPLASTIC ADHESIVE FOAM

BACKGROUND OF THE INVENTION

This invention relates to hot melt thermoplastic adhesive dispensing systems and, more particularly, to systems for dispensing hot melt thermoplastic adhesive foam. Specifically, this invention is directed to a method and apparatus for controlling the density of dispensed adhesive foam in order to assure uniform foam characteristics.

Hot melt thermoplastic adhesives, or so called "hot melts", are widely used throughout industry for packaging and cartoning as well as product assembly. One of the most common problems with conventional hot melt adhesives concerns the spreadability of the adhesive after application so as to obtain sufficient surface contact between the adhesive and adhered surfaces to achieve a good bond. Generally, the greater the area of surface contact, the greater is the strength of the bond.

The relatively high viscosity and quick set time of conventional molten hot melt adhesives all combine to prevent the adhesive from spreading over a large surface area when the adhesive is applied in the molten state to a substrate. Instead of spreading, the molten hot melt adhesive sets up as a thick bead on the substrate. Even when quickly compressed, as, for example, between two flaps of a carton, the molten hot melt adhesive is difficult to spread or squeeze out to a thin film.

U.S. Pat. No. 4,059,714 entitled "Hot Melt Thermoplastic Adhesive Foam System", which is commonly assigned, discloses, among other things, that the strength of a bond achieved with a given quantity of a selected hot melt adhesive is appreciably improved if the adhesive is applied as a cellular foam rather than as a conventional non-foamed adhesive. The increased bonding strength of foamed hot melt adhesive, at least in part, results from the fact that the foamed adhesive may be spread over a substantially greater area than the same adhesive in the non-foamed state under the same amount of compression. Since the strength of the bond is a function of the surface area covered by the bond, foaming the hot melt adhesive results in a given quantity of adhesive producing a substantially stronger bond than the same adhesive non-foamed.

Foamed hot melt adhesives have also been found to have other advantages over the same adhesives applied in the non-foamed state. Specifically, foamed hot melt adhesives have been found to have a longer "open" time during which the adhesive retains its bonding strength after being applied to a substrate. The longer "open" time of the foamed hot melt adhesive over the same adhesive non-foamed results from the small air or gas cells within the foam which act as insulative barriers to prevent the escape of heat and consequent solidification of the adhesive.

Furthermore, foamed hot melt adhesives set and adhere faster than the same adhesives non-foamed when compressed between two surfaces. When the foamed hot melt adhesive is compressed between the two surfaces, the foamed adhesive spreads over a substantially greater area than the adhesive in a non-foamed state with the result that the greater surface contact causes the foamed adhesive to then give up heat faster and therefore sets more quickly than the non-foamed adhesive.

Aforementioned U.S. Pat. No. 4,059,714 discloses a method for manufacturing hot melt thermoplastic adhesive foam wherein solid thermoplastic adhesive material is melted in a heated reservoir. The molten adhesive is then mixed with air or a gas, such as nitrogen, and pressurized by either a one-stage or two-stage geared pump. Within the pump, the molten adhesive and gas are thoroughly mixed, and the gas is forced into solution with the molten adhesive by high pressure, as, for example, 300 pounds per square inch. The pressurized molten adhesive/gas solution is then supplied to a valve type adhesive dispensing gun from which the molten adhesive/gas solution is dispensed at atmospheric pressure, whereupon the gas is released from solution and becomes entrapped to form a closed cellular adhesive foam having the desirable adhesive characteristics described hereinabove. The resultant foamed adhesive in an uncompressed state sets up as a homogenous solid foam having closed air or gas cells distributed throughout the adhesive.

Typically, the use of foamed hot melt adhesive results in about a 50 percent reduction in the total quantity of hot melt adhesive required to effect the same or a better bond and without any appreciable additional material cost since the air or gas used for forming the foam is available at little or no cost. The utility of foamed hot melt adhesives is realized by a reduction in the weight of applied adhesive, which means less consumption of adhesive and less cost to the user.

Generally, hot melt thermoplastic adhesive foam dispensing apparatus is adjusted for dispensing foamed hot melt adhesive having an optimum bonding strength under the conditions in which the adhesive is used. For a given application, the particular adhesive characteristics of the foamed adhesive depend on the type of hot melt thermoplastic adhesive, the material or materials to be bonded together, the amount of adhesive to be used, the amount of compressive force to be applied, the environment in which the adhesive is dispensed, the desired "open" and set times, etc. Such factors are taken into consideration when the dispensing apparatus is adjusted so that optimum bonding strength is obtained.

The common practice has been to adjust the hot melt thermoplastic adhesive foam dispensing apparatus while packaging and cartoning or product assembly is in full operation so that optimum quantities of material are applied to the substrate and optimum bonding strength is obtained. We have discovered, however, that the bonding strength and the evenness of application of foamed hot melt adhesive is adversely affected by interruptions in the use of the dispensing apparatus. These interruptions may occur during coffee and lunch breaks, shift changes, production line shutdowns, or equipment downtime. Any reduction in bonding strength which results from these interruptions is particularly evident for a short period of time after reinitiation of packaging and cartoning or product assembly when the dispensing apparatus is again called upon to dispense foamed adhesive.

If the hot melt thermoplastic adhesive foam dispensing apparatus idles for a period of time, such as during one of these interruptions, the density of the foamed hot melt adhesive decreases, and generally so too does the bonding strength of the adhesive foam. If the dispensing apparatus is called upon to dispense foamed adhesive after it has idled for a relatively long period of time, the dispensing apparatus may even sputter and spit adhesive from the outlet nozzle and create a very uneven deposit of adhesive material on the substrate. We have discovered, and one aspect of this invention is predicated upon its discovery, that the decrease or change in foam density which occurs during one of these dispensing interruptions is attributable to the admixture of excess air or gas with the molten adhesive as the dispensing apparatus idles.

SUMMARY OF THE INVENTION

The primary objective of this invention is to provide hot melt thermoplastic adhesive foam dispensing apparatus which dispenses foamed adhesive having substantially uniform foam chracteristics under all operating conditions encountered in use.

An associated objective is to control the density of the foamed adhesive supply so as to achieve uniform bonding strength and evenness of application due to controlled volumetric expansion of the dispensed adhesive foam.

In accordance with this invention, a method and apparatus are disclosed for controlling the density of dispensed hot melt thermoplastic adhesive foam in order to assure uniform foam characteristics. According to a preferred practice of this invention, the supply of gas to the molten adhesive is interrupted so as to prevent an excess volume of gas from being admixed with the molten adhesive whenever foamed adhesive is not being dispensed from the foamed adhesive dispensing system, thereby stabilizing the density of the foamed adhesive supply. Whenever adhesive foam is being dispensed from the system, the supply of gas to the adhesive is maintained.

In a preferred embodiment of this invention, solid thermoplastic adhesive material is melted in a heated melting tank. A two-stage geared pump mixes the molten adhesive with gas from a gas supply connected to the pump when adhesive foam is being dispensed. Within the pump, the molten adhesive and gas are thoroughly mixed, and the gas is forced under pump outlet pressure into solution with the molten adhesive. The pressurized molten adhesive/gas solution is then supplied to a dispensing means from which the molten adhesive/gas solution is dispensed at atmospheric pressure. When the foamed adhesive is not being dispensed, the gas flow to the pump is discontinued.

Preferably, the gas supply is connected to the pump through a dispenser activated valve means. The dispenser activated valve means preferably includes a control circuit for energizing a solenoid-operated valve upon activation of a sensing means responsive to actuation of the dispensing means so that gas flows to the pump to be mixed with the molten adhesive. When the dispensing means is not actuated, the solenoid-operated valve is de-energized so that the flow of gas is shut off.

The preferred embodiment of this invention has been found to sufficiently stabilize the density of the foamed adhesive supply so that uniform foam characteristics are assured during use of the dispensing apparatus. Although the density of the foamed adhesive supply tends to increase as the idle time for the dispensing apparatus increases, the density of the dispensed adhesive foam quickly recovers to the desired density in response to the gas which flows to the pump when the dispensing apparatus again is called upon to dispense adhesive foam.

According to a modified practice of this invention, the control circuit includes timer circuitry for periodically energizing the solenoid-operated valve so that pulses of gas flow to the pump to be mixed with the molten adhesive in order to more closely control the density of the foamed adhesive supply. Also, according to another modified practice of this invention, the control circuit includes additional timer circuitry for energizing the solenoid-operated valve for a predetermined period of time upon start up of the dispensing apparatus so that gas flows in an uninterrupted fashion to the pump to be mixed with the molten adhesive for initially creating a supply of foamed adhesive.

BRIEF DESCRIPTION OF THE DRAWINGS

These and other features and advantages of this invention will be more apparent from the following detailed description given in conjunction with the accompanying drawings. In the drawings:

FIG. 6 is a schematic circuit diagram of a preferred control circuit included in the adhesive foam density controlling apparatus shown in FIG. 1.

Referring now to FIG. 1, there is illustrated a hot melt thermoplastic adhesive foam dispensing apparatus 10. Generally, dispensing apparatus 10 comprises a melting tank 15, a gear pump 16, an air or gas supply 17, and a dispensing means 18 in the form of a dispensing gun. In practice, solid thermoplastic adhesive in the form of pellets, blocks, or slugs is placed in melting tank 15 and there melted by electric heaters 19 contained in the walls of the melting tank. The molten adhesive then flows by gravity to the adhesive inlet port 20 of pump 16. Low pressure gas, as, for example, air or nitrogen, at a pressure slightly above that of the atmosphere, simultaneously flows from supply 17 through a gas line 21 to the gas inlet port 22 of pump 16.

With reference to FIGS. 1 and 2, molten adhesive and gas flow through the respective inlet ports 20 and 22 into the interior of pump 16 where the intermeshing teeth of a pair of gears 36a, 37a cause the molten adhesive and gas to be thoroughly mixed and to be forced under pressure into a molten adhesive/gas solution 11. The molten adhesive/gas solution then flows from the outlet of pump 16 through a conduit 23, a filter 24, into an outlet duct 25 of a manifold block 26, and through a hose 27 to dispensing gun 18.

Figure 1:
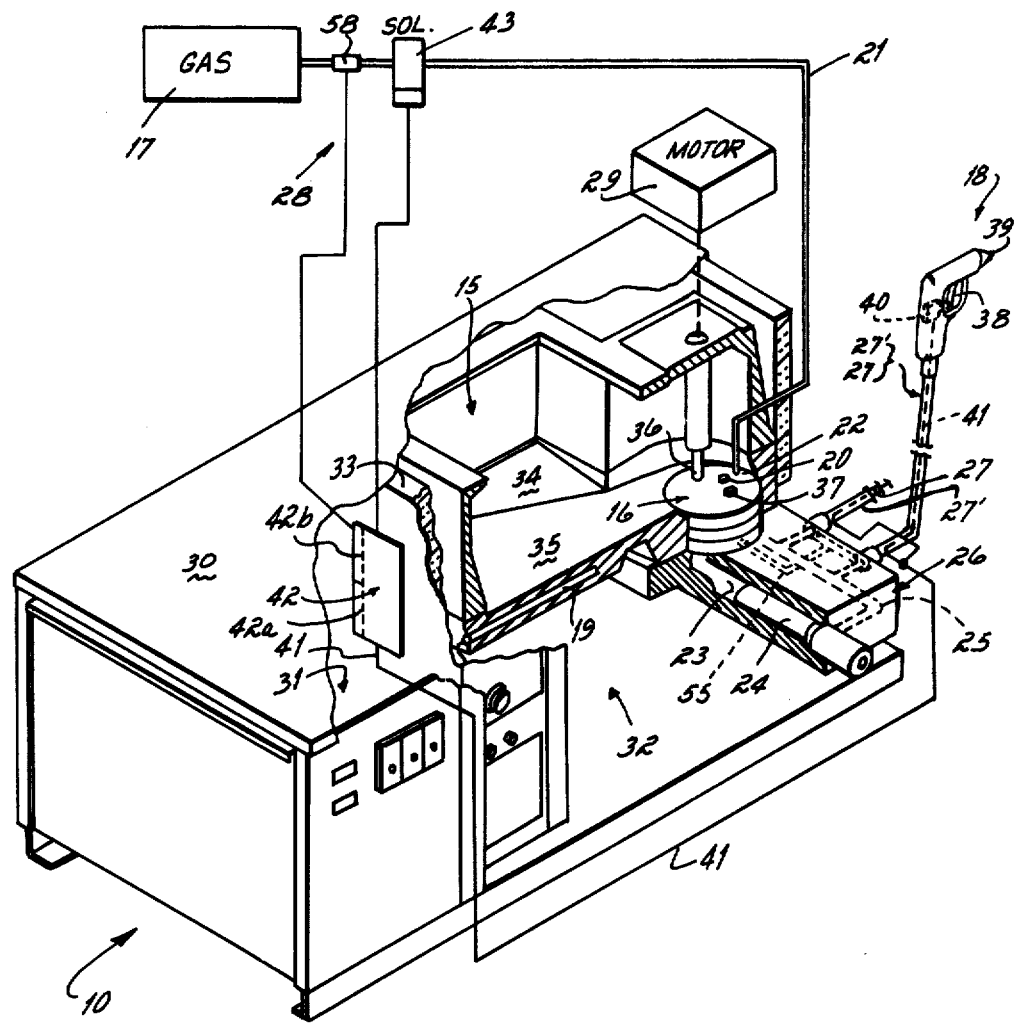
FIG. 1 is a perspective view, partly broken away, of a hot melt thermoplastic adhesive foam dispensing apparatus incorporating the preferred adhesive foam density controlling apparatus of this invention.

Considered in more detail, melting tank 15 and pump 16 of dispensing apparatus 10 are contained within a sheet metal housing 30. Housing 30 is divided into two sections, a control section 31 and a reservoir section 32. The two sections 31, 32 are separated by a heat insulated barrier 33 which protects the electrical apparatus contained within control section 31 from the heat generated by melting tank 15 of reservoir section 32. Within the two sections 31, 32 are the usual temperature control thermostats as well as the temperature setting and measuring gauges for controlling and indicating the temperature of the molten adhesive in melting tank 15.

Melting tank 15 may be a conventional open top melting pot having bottom walls 34, 35 which slope downwardly toward adhesive inlet port 20 of pump 16. Bottom walls 34, 35 of melting tank 15 contain heaters 19 which are operative to heat solid thermoplastic material to a temperature at which the adhesive is to be applied. That temperature is usually on the order of 175° F. to 450° F. for most hot melt thermoplastic adhesives, such as Eastabond A-3 adhesive, a polyethylene base material manufactured by Eastman Chemical Company of Rochester, N.Y.

Pump 16 is preferably a conventional two-stage gear pump more fully described in aforementioned U.S. Pat. No. 4,059,714 the disclosure of which is incorporated by reference herein. The first stage of pump 16 meters molten adhesive from adhesive inlet port 20 to the second stage of the pump. The second stage of pump 16 includes gears 36a, 37a respectively mounted on a pair of parallel shafts 36, 37. One shaft 36 is driven by a motor 29, as, for example, a pneumatic motor, while the other shaft 37 is an idler shaft. The intermeshing teeth of gears 36a, 37a mix the molten adhesive metered from the first stage of pump 16 with gas at gas inlet port 22 and pressurize the mixture to form a molten adhesive/gas solution so as to create a supply of the solution at the outlet of the pump.

Pump 16 is operable to increase the pressure of the molten adhesive and gas mixture to a pressure required for the applications, as, for example, 300 to 1200 pounds per square inch, which pressure is maintained at conduit 23, filter 24, outlet duct 25 of manifold block 26, and hose 27 connected to dispensing gun 18. At such a pressure, the gas contained within the molten adhesive is maintained in solution with the molten adhesive, in which condition it remains until dispensed by dispensing gun 18.

Dispensing gun 18 comprises a conventional valve type recirculating dispensing gun supplied with the molten adhesive/gas solution through hose 27. A hose 27′, which is preferably coaxial with hose 27, and a return duct 55 of manifold block 26 provide recirculation of the molten adhesive/gas solution from dispensing gun 18 back to pump 16. Dispensing gun 18 includes a trigger mechanism 38 which is actuable so that the molten adhesive/gas solution flows from hose 27 to a nozzle 39 and is dispensed at atmospheric pressure.

In accordance with the preferred embodiment of this invention, dispensing apparatus 10 includes a dispenser activated valve means 28 for controlling the flow of gas from supply 17 to pump 16 in order to stabilize the density of the foamed adhesive supply. Dispenser activated valve means 28 allows gas to flow from supply 17 through gas line 21 to gas inlet port 22 of pump 16 when foamed adhesive is being dispensed, and at other times the dispenser activated valve means prevents the flow of gas to the pump.

Preferably, dispenser activated valve means 28 includes a sensing device 40 in the form of a switch which is activated when trigger mechanism 38 of dispensing gun 18 is actuated for dispensing adhesive foam. Switch 40 is connected by wires 41 included in dispenser activated valve means 28 to a control circuit 42 also included in the dispenser activated valve means. Control circuit 42 is responsive to activation of switch 40 for energizing a solenoid-operated valve 43 included in dispenser activated valve means 28 so that gas flows from supply 17 to pump 16 when trigger mechanism 38 of dispensing gun 18 is actuated. Conversely, when trigger mechanism 38 of dispensing gun 18 is not actuated, switch 40 is not activated, and control circuit 42 de-energizes solenoid-operated valve 43 so that no gas flows from supply 17 to pump 16. By thus controlling the flow of gas to the molten adhesive in pump 16, the density of the foamed adhesive supply at the outlet of the pump and at conduit 23, filter 24, outlet duct 25 of manifold block 26, and hose 27 is prevented from decreasing, and, as a result, the density of the foamed adhesive is not reduced.

Figure 1A:
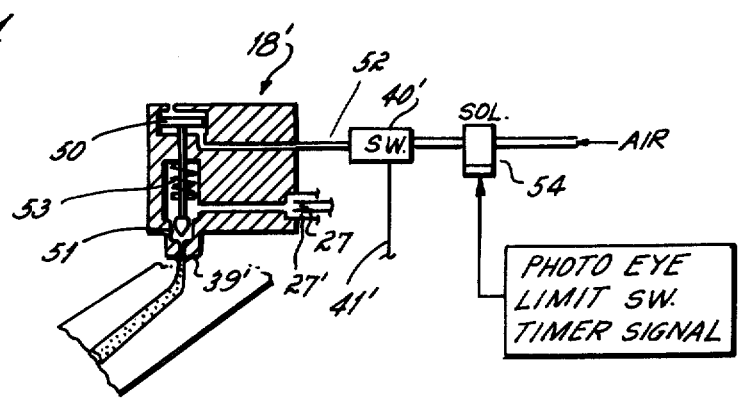
FIG. 1A illustrates a modification of the dispensing apparatus shown in FIG. 1.
Figure 2:
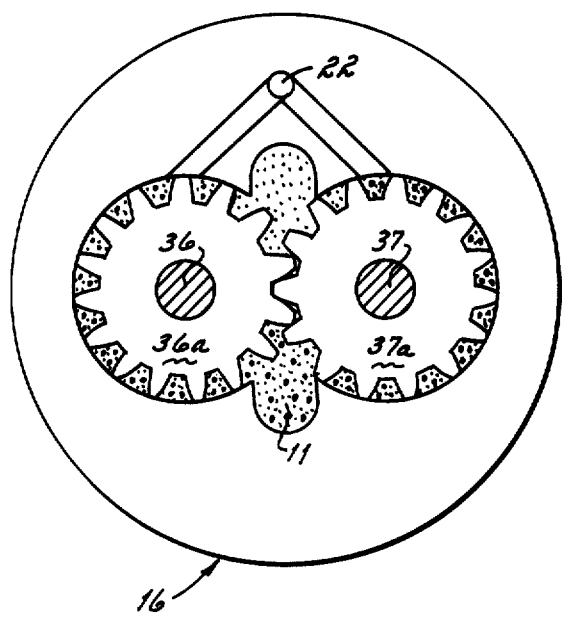
FIG. 2 is a cross-sectional view through the gear pump of the dispensing apparatus shown in FIG. 1.

A modification of the dispensing apparatus 10 is shown in FIG. 1A wherein dispensing gun 18 of FIG. 1 is replaced by a conventional automatic recirculating dispensing device 18′ supplied with the molten adhesive/gas solution through hose 27. Hose 27′ and return duct 55 of manifold block 26 provide recirculation of the molten adhesive/gas solution from automatic dispensing device 18′ back to pump 16. Automatic dispensing device 18′ includes a pneumatically operated piston 50 attached to a flow control valve 51. When pressurized air is supplied through an air line 52, piston 50 pushes upwardly against a spring 53 and opens valve 51 so that the molten adhesive/gas solution flows from hose 27 to a nozzle 39′ and is dispensed at atmospheric pressure.

Automatic dispensing device 18′ is activated by a photoelectric cell, a limit switch, or a timer signal synchronized with packaging and cartoning or product assembly so that foamed adhesive is dispensed at the proper time. The photoelectric cell, limit switch, or timer signal energizes, a solenoid-operated valve 54 which allows air to flow from a pressurized air supply (not shown) to air line 52 so as to operate piston 50.

In accordance with a modified form of this invention, a sensing means 40′ in the form of a pressure switch in air line 52 is activated by the pressurized air which operates piston 50 of automatic dispensing device 18′. Pressure switch 40′ is connected by wires 41′ to control circuit 42. Control circuit 42 is responsive to activation of pressure switch 40′ for energizing solenoid-operated valve 43 so that gas flows from supply 17 to pump 16 when automatic dispensing device 18′ is actuated. Conversely, when automatic dispensing device 18′ is not actuated, pressure switch 40′ is not activated, and control circuit 42 de-energizes solenoid-operated valve 43 so that no gas flows from supply 17 to pump 16. By thus controlling the flow of gas to the molten adhesive in pump 16, the density of the foamed adhesive supply at the outlet of the pump and at conduit 23, filter 24, outlet duct 25 of manifold block 26, and hose 27 is prevented from decreasing, and, as a result, the density of the foamed adhesive is not reduced.

In the operation of dispensing apparatus 10 disclosed in FIGS. 1 and 1A, solid thermoplastic adhesive in the form of pellets, blocks, or chunks is placed in melting tank 15 where the solid thermoplastic material melts and forms a pool, or reservoir, of molten adhesive. The molten adhesive flows downwardly over downwardly sloping bottom walls 34, 35 of melting tank 15 into adhesive inlet port 20 of pump 16.

Air, nitrogen, or any gas which is inert in the presence of foamed adhesive flows at a pressure slightly above atmospheric pressure, as, for example, five pounds per square inch or less, from supply 17 through solenoid-operated valve 43 and gas line 21 to gas inlet port 22 of pump 16 whenever dispensing means 18 or 18' is actuated so as to replenish the foamed adhesive supply while adhesive foam is being dispensed. When adhesive foam is not being dispensed, dispensing means 18 or 18' is not actuated, and solenoid-operated valve 43 shuts off the flow of gas from supply 17 to pump 16 so that admixture of an excess volume of gas with the molten adhesive is avoided.

Figure 3:
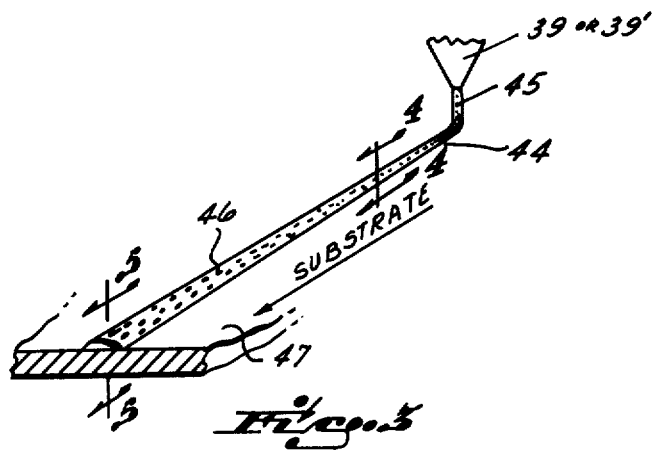
FIG. 3 is a perspective view of a bead of foamed adhesive produced in accordance with the practice of this invention.
Figures 4, 5:
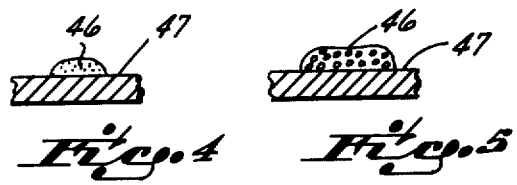
FIG. 4 is a cross-sectional view taken along line 4—4 of FIG. 3.
FIG. 5 is a cross-sectional view taken along line 5—5 of FIG. 3.

Upon actuation of dispensing means 18 or 18', the molten adhesive/gas solution emerges as a liquid from nozzle 39 or 39'. The liquid foams as tiny gas bubbles or cells form and convert the liquid to a foamy substance when the liquid is exposed to atmospheric pressure. This is illustrated in FIG. 3 where the interface 44 of the liquid 45 and foam 46 is illustrated as being located above the point of control of the adhesive stream being applied to a substrate 47. The cells or bubbles continue to increase in number and size as the stream moves further from nozzle 39 or 39'. Even after the bead of foamed adhesive 46 is applied to substrate 47, it may continue to increase in volume until a pressure equalization between the gas bubbles and the atmosphere occurs or the adhesive foam solidifies. The growth is depicted by comparison of FIG. 4 with FIG. 5.

In accordance with the preferred embodiment of this invention, while adhesive foam is being dispensed, the supply of foamed adhesive is replenished by mixing gas with thermoplastic adhesive in the molten state and then pressurizing the mixture so as to force the gas into solution with the molten adhesive. However, the supply of gas is interrupted so as to prevent an excess volume of gas from being admixed with the molten adhesive when foamed adhesive is not being dispensed, thereby stabilizing the density of the foamed adhesive supply. It has been found that dispenser activated valve means 28 sufficiently stabilizes the density of the foamed adhesive supply so that uniform foam characteristics are assured. Although the density of the foamed adhesive supply increases as the idle time for dispensing apparatus 10 increases, the density of the dispensed adhesive foam quickly recovers to the desired density in response to gas which is supplied when the dispensing apparatus again is called upon to dispense adhesive foam.

Nevertheless, in a modified form of this invention, control circuit 42 includes timer circuitry 42a for periodically energizing solenoid-operated valve 43 so that pulses of gas flow from supply 17 to pump 16 for replacing any gas which is lost while dispensing apparatus 10 idles in order to more closely control the density of the foamed adhesive supply. The frequency at which timer circuitry 42a feeds pulses of gas to pump 16 depends upon various factors, such as the type of hot melt thermoplastic adhesive, the temperature of the molten adhesive, and the type of pump and pressure at which the pump operates, etc. In another modified form of this invention, control circuit 42 includes additional timer circuitry 42b responsive to activation of control section 31 when dispensing apparatus 10 is started up for energizing solenoid-operated valve 43 for a predetermined period of time, as, for example, two to three minutes, so that gas flows in an uninterrupted fashion from supply 17 to pump 16 for initially creating a supply of foamed adhesive.

The preferred embodiment of control circuit 42 is shown in FIG. 6. Control circuit 42 selectively energizes the coil of solenoid-operated valve 43 for regulating the flow of gas from supply 17 to pump 16 so as to stabilize the density of the foamed adhesive supply under all operating conditions of dispensing apparatus 10.

In order to achieve such a result, control circuit 42 is responsive to the activation of sensing means 40 or 40', when adhesive foam is being dispensed, for energizing the coil of solenoid-operated valve 43 so that gas flows from supply 17 to pump 16 and, when adhesive foam is not being dispensed, de-energizing the solenoid-operated valve so that the flow of gas is shut off. In order to compensate for periods during which dispensing apparatus 10 is idle, control circuit 42 preferably includes timer circuitry 42a for energizing the coil of solenoid-operated valve 43 so that gas flows from supply 17 to pump 16 for a short duration of time on a periodic basis. Timer circuitry 42a has independently adjustable on and off times so as to meet the requirements for stabilizing the density of the particular foamed adhesive. Furthermore, in order to create a supply of foamed adhesive during the initial start up of dispensing apparatus 10, control circuit 42 also preferably includes additional timer circuitry 42b. Timer circuitry 42b is activated in response to the manual actuation of the start up pushbutton (not shown) for dispensing apparatus 10 and energizes the coil of solenoid-operated valve 43 so that gas flows from supply 17 to pump 16 for an adjustable period of time after start up of the dispensing apparatus.

Control circuit 42 includes a transformer T1 having a 115 or 240 VAC primary with a dual 12 VAC secondary. When transformer T1 is connected to a 240 VAC power source, the transformer is wired with a series primary and a series secondary for a 24 VAC, one amp output capability.

A diode bridge D1 rectifies the 24 VAC across the secondary of transformer T1 for providing an unfiltered 24 VDC power supply. A diode D2 isolates the unfiltered 24 VDC power supply from the filter formed by a capacitor C1. A resistor R1 and a Zener diode D3 comprise a shunt regulator for providing a 15 VDC power supply.

The 15 VDC power supply is connected to a five volt regulator IC5. IC5 provides a five VDC power supply. The five VDC power supply is used throughout the remainder of control circuit 42.

Actuation of dispensing means 18 or 18' causes activation of the respective sensing means 40 or 40' which effects a switch closure and connects the five VDC power supply through a resistor R14 to the input (pin 1) of an optical isolator IC4. When 5 VDC is applied to pin 1 of optical isolator IC4, pin 5 of the optical isolator is connected to common via pin 4 of the optical isolator. When pin 5 of optical isolator IC4 is connected to common, forward-bias is applied to an PNP transistor Q1 through resistors R10 and R9, respectively, and a diode D3.

When transistor Q1 turns on, a capacitor C11 is connected through the emitter-collector circuit of transistor Q1 to the five VDC power supply and begins to charge. When capacitor C11 is sufficiently charged, the voltage developed across capacitor C11 forward biases an output transistor Q2 through resistors R11 and R12. Transistor Q2 is preferably a Darlington for high impedance.

When transistor Q2 turns on, the collector of transistor Q2 drops to common potential, thereby applying 24 VDC across the coil of solenoid-operated valve 43.

Preferably, 24 VDC is also applied across an LED D5 which is series-connected with a current limiting resistor R13, thereby providing a visual indication that solenoid-operated valve 43 has been energized.

When sensing means 40 or 40' is deactivated upon the deactuation of dispensing means 18 or 18', the forward bias is removed from transistor Q1. When transistor Q1 turns off, capacitor C11 will discharge through resistor R11, the base-emitter circuit of transistor Q2, and resistor R12. Capacitor C11 and resistors R11 and R12 form a delay circuit for maintaining the forward bias applied to transistor Q2 for a few seconds. The delay circuit provides a few seconds after dispensing means 18 or 18' is deactuated before the flow of gas from supply 17 to pump 16 is shut off. This is important in order to provide a delay in applications which require either stitching or a very high cycle rate for preventing solenoid-operated valve 43 from chattering, or opening and closing, during each actuation of dispensing means 18 or 18'. What this accomplishes is not only a longer solenoid life, but also means that any time the duty cycle is under two or three seconds gas will flow continuously from supply 17 to pump 16.

After the period of the delay, capacitor C11 will have discharged so that the voltage across the capacitor is below that required to forward bias transistor Q2. When transistor Q2 turns off, the coil of solenoid-operated valve 43 is de-energized. A diode D4 is back biased across the coil of solenoid-operated valve 43 for dissipating any electrical energy stored in the coil of the solenoid-operated valve when the coil of the solenoid-operated valve is de-energized.

Control circuit 42 preferably includes 3 Ferranti electronic timer chips #ZN1034E, namely, IC1–IC3. Pin 4 of each chip is connected to the five VDC power supply. The five VDC power supply is decoupled by capacitors C1, C7, and C4, respectively, for preventing noise from falsely triggering the chips. The timing period for each of the chips IC1–IC3 is determined by an associated RC network connected between pins 14 and 13 and between pin 13 and common. Each RC network provides the timing components for an internal oscillator connected to an associated series of binary counters included in each chip.

Each of the chips IC1–IC3 has two outputs, one at pin 2 and its complement at pin 3. When a chip is activated, the outputs reverse states, and the internal oscillator is coupled to the associated series of binary counters until a preset count of 4,095 counts is reached. When the count of 4,095 is reached, the outputs of the chip revert back to their initial states.

Timing circuitry 42a comprises two chips IC1 and IC2 connected in a flip-flop arrangement. Timer circuitry 42a operates in the following manner. When dispensing apparatus 10 is started up, a capacitor C12 beings to charge, and a positive voltage is developed across the capacitor and applied to the trigger input (pin 1) of IC2. Since pin 1 of IC2 is at a positive potential, the states at the outputs of IC2 are set so that a high state appears at pin 2 of IC2 and a low state appears at pin 3 of IC2. Capacitor C12 assures that when dispensing apparatus 10 is started up, timer circuitry 42a will be set so that the coil of solenoid-operated valve 43 will be de-energized.

Pin 3 of IC2 is connected through a resistor R3 to the trigger input (pin 1) of IC1. The low state at pin 3 of IC2 which initially is applied to pin 1 of IC1 activates IC1 and causes a timing sequence to commence.

The time period of IC1 is determined by the frequency of the internal oscillator of IC1 controlled by the RC network which includes a potentiometer P1, a resistor R4, and a capacitor C3. The RC network preferably provides a latitude of approximately one minute to 50 minutes of time duration for the time period of IC1.

When the timing sequence which involves IC1 commences, the output at pin 2 of IC1 transposes to a low state, that is, at approximately common potential. The output at pin 3 of IC1 transposes to a high state, that is, at a potential of approximately three VDC. Pin 3 of IC1 is connected through a resistor R2 to the trigger input (pin 1) of IC2. While the output at pin 3 of IC1 is at a high state, IC2 is disenabled.

However, when the timing sequence which involves IC1 terminates, the output at pin 2 of IC1 transposes to a high state, and the output at pin 3 of IC1 transposes to a low state. When the output at pin 3 of IC1 transposes to a low state, IC2 is activated and another timing sequence commences.

When the timing sequence which involves IC2 commences, the output at pin 2 of IC2 transposes to a low state. The output at pin 3 of IC2 transposes to a high state. While the output at pin 3 of IC2 is at a high state, IC1 is disabled. When the output at pin 2 of IC2 transposes to a low state, transistor Q1 is forward biased through resistors R10 and R9, respectively, and diode D1, thereby energizing the coil of solenoid-operated valve 43 for the time period determined by the frequency of the internal oscillator of IC2 controlled by the RC network which includes a potentiometer P3, a resistor R5, and a capacitor C9. Preferably, pin 3 of IC1 is connected through a current limiting resistor R1 and an LED D6 to pin 2 of IC1 so that LED D6 changes from a red to a green light display, thereby indicating that solenoid-operated valve 43 is energized for allowing gas to flow from supply 17 to pump 16.

When the timing sequence which involves IC2 terminates, the output at pin 2 of IC2 transposes back to a high state, and the output at pin 3 of IC2 transposes back to a low state such that the outputs of IC1 and IC2 reassume their initial states, and the coil of solenoid-operated valve 43 is de-energized. At this point, the timing sequence which involves IC1 commences again.

Timer circuitry 42b is activated by a switch 58, which may be a pressure switch positioned in gas line 21 so that the pressure switch is actuated in response to start up of dispensing apparatus 10. When switch 58 is actuated, the trigger input (pin 1) of IC3 is connected to common, thereby activating IC3 which causes a timing sequence to commence.

When the timing sequence which involves IC3 commences, the output at pin 2 of IC3 transposes to a low state. The output at pin 3 of IC3 transposes to a high state. When the output at pin 2 of IC3 transposes to a low state, transistor Q1 is forward-biased through resistors R10 and R9, respectively, and diode D2, thereby energizing the coil of solenoid-operated valve 43 for allowing gas to flow from supply 17 to pump 16 for initially creating a supply of foamed adhesive. Preferably, pin 3 of IC3 is connected through a current limiting resistor R6 and an LED D7 to pin 2 of IC3 so that LED D7 changes from a red to a green light, thereby indicating that solenoid-operated valve 43 is energized.

After a time period determined by the internal oscillator of IC3 controlled by the RC network which includes a potentiometer P2, a resistor R7, and a capacitor C6, the output at pin 2 of IC3 transposes back to a high state, and the output at pin 3 of IC3 transposes back to a low state so that solenoid-operated valve 43 is de-energized.

Potentiometers P1 and P3 are respectively adjusted for controlling the on and off times for the periodic flow of gas from supply 17 to pump 16. Specifically, potentiometer P1 is adjusted for controlling the period between times when pulses of gas are supplied to pump 16, whereas potentiometer P3 is adjusted for controlling the length of time during which each pulse of gas is supplied. The times may be set, for example, at 15 minutes for the off time and 15 seconds for the on time. Potentiometer P2 is adjusted for controlling the time during which gas is supplied to pump 16 in response to start up of dispensing apparatus 10. The start up time may be set, for example, at three minutes. Component types and values for a representative implementation of control circuit 42 are shown in FIG. 6.

While we have described several different embodiments, those persons skilled in the art will appreciate other changes and modifications which may be made without departing from the spirit of our invention. For example, in order to obtain optimum control of the density of the foamed adhesive supply, a density detector could be incorporated for continuously monitoring the density of the foamed adhesive supply and controlling the flow of gas to the pump in order to maintain the density of the foamed adhesive supply at a predetermined value. Alternatively, the pump could be redesigned so that the hydraulic pressure within the pump would be sensed and the flow of gas to the pump would be controlled in order to maintain the density of the foamed adhesive supply at a predetermined value. Furthermore, although the various embodiments have been described in connection with the use of hot melt thermoplastic adhesives, our invention also applies to the use of other types of adhesive or sealant products. In order to ascertain the true scope of our invention, reference should be directed to the following appended claims.

We claim:

1. Apparatus for controlling the uniformity of dispensed hot melt thermoplastic foamed adhesive comprising:
   means for heating solid thermoplastic adhesive material for converting said solid adhesive material to a molten state;
   means for supplying gas;
   means for agitating and pressurizing said molten adhesive in the presence of said gas so as to force said gas into solution with said molten adhesive;
   means for dispensing said molten adhesive and gas solution at a pressure below the solution maintenance pressure of said solution whereby said gas is released from solution and forms an adhesive foam; and
   means for selectively controlling said gas supplying means so that additional gas is supplied to said agitating and pressurizing means in response to actuation of said dispensing means.

2. The apparatus of claim 1 wherein said dispensing means comprises a dispensing gun having a selectively actuable trigger mechanism for controlling flow from said dispensing gun and wherein said controlling means includes a solenoid-operated valve for selectively feeding said gas from said gas supplying means to said agitating and pressurizing means, sensing means activated in response to actuation of said dispensing gun, and a control circuit responsive to activation of said sensing means for energizing said solenoid-operated valve so that said gas flows from said gas supplying means to said agitating and pressurizing means.

3. The apparatus of claim 1 wherein said dispensing means comprises an automatic dispensing device having a selectively openable valve for controlling flow from said device and means for automatically actuating said device and wherein said controlling means includes a solenoid-operated valve for selectively feeding said gas from said gas supplying means to said agitating and pressurizing means, sensing means activated in response to actuation of said device, and a control circuit responsive to activation of said sensing means for energizing said solenoid-operated valve so that said gas flows from said gas supplying means to said agitating and pressurizing means.

4. The apparatus of claim 2 or 3 wherein said control circuit includes timer circuitry for periodically energizing said solenoid-operated valve so that pulses of said gas flow from said gas supplying means to said agitating and pressurizing means whereby the density of said molten adhesive and gas solution is more closely stabilized.

5. The apparatus of claim 4 wherein said control circuit includes additional timer circuitry responsive to start up of said apparatus for energizing said solenoid-operated valve so that said gas flows from said gas supplying means to said agitating and pressurizing means for a predetermined period of time.

6. The apparatus of claim 2 or 3 wherein said control circuit includes timer circuitry responsive to start up of said apparatus for energizing said solenoid-operated valve so that said gas flows from said gas supplying means to said agitating and pressurizing means for a predetermined period of time.

7. Apparatus for controlling the uniformity of dispensed hot melt thermoplastic foamed adhesive comprising:
   means for heating solid thermoplastic adhesive material for converting said solid adhesive material to a molten state;
   means for supplying gas;
   means for agitating and pressurizing said molten adhesive in the presence of said gas so as to force said gas into solution with said molten adhesive;
   means for dispensing said molten adhesive and gas solution at a pressure below the solution maintenance pressure of said solution whereby said gas is released from solution and forms an adhesive foam; and
   means for selectively controlling said gas supplying means during interrupted operation of said dispensing means so that only sufficient gas is supplied to said agitating and pressurizing means to maintain the density of said adhesive foam at a substantially constant value.

8. The apparatus of claim 7 wherein said dispensing means comprises a dispensing gun having a selectively actuable trigger mechanism for controlling flow from said dispensing gun and wherein said controlling means includes a solenoid-operated valve for selectively feeding said gas from said gas supplying means to said agitating and pressurizing means, sensing means activated in response to actuation of said dispensing gun, and a control circuit responsive to activation of said sensing means for energizing said solenoid-operated valve so that additional gas flows from said gas supplying means to said agitating and pressurizing means.

9. The apparatus of claim 7 wherein said dispensing means comprises an automatic dispensing device having a selectively openable valve for controlling flow from said device and means for automatically actuating said device and wherein said controlling means includes a solenoid-operated valve for selectively feeding said gas from said gas supplying means to said agitating and pressurizing means, sensing means activated in response to actuation of said device, and a control circuit responsive to activation of said sensing means for energizing said solenoid-operated valve so that additional gas flows from said gas supplying means to said agitating and pressurizing means.

10. The apparatus of claim 8 or 9 wherein said control circuit includes timer circuitry for periodically energizing said solenoid-operated valve so that pulses of said gas flow from said gas supplying means to said agitating and pressurizing means whereby the density of said molten adhesive and gas solution is more closely stabilized.

11. The apparatus of claim 10 wherein said control circuit includes additional timer circuitry responsive to start up of said apparatus for energizing said solenoid-operated valve so that said gas flows from said gas supplying means to said agitating and pressurizing means for a predetermined period of time.

12. The apparatus of claim 8 or 9 wherein said control circuit includes timer circuitry responsive to start up of said apparatus for energizing said solenoid-operated valve so that said gas flows from said gas supplying means to said agitating and pressurizing means for a predetermined period of time.

13. A method for controlling the uniformity of dispensed hot melt thermoplastic foamed adhesive and for avoiding spitting, sputtering and uneven deposit of said dispensed adhesive, including the steps of:
heating solid thermoplastic adhesive material for converting the solid adhesive material to a molten state,
providing a supply of gas;
agitating the molten adhesive in the presence of the gas so as to obtain a mixture of the gas with the molten adhesive;
pressurizing the mixture of molten adhesive and gas for forcing the gas into solution with the molten adhesive;
dispensing the molten adhesive and gas solution at a pressure below the solution maintenance pressure of the solution whereby the gas is released from solution and forms an adhesive foam; and
selectively controlling the supply of gas so that additional gas is supplied to the mixture of molten adhesive and gas in response to dispensing of the molten adhesive and gas solution.

14. The method of claim 13 further including the step of periodically supplying pulses of the gas in order to more closely stabilize the density of the molten adhesive and gas solution.

15. The method of claim 13 or 14 further including the step of initially supplying the gas for a predetermined period of time in order to produce the molten adhesive and gas solution.

16. Apparatus for controlling the uniformity of dispensed hot melt thermoplastic foamed adhesive comprising:

means for heating solid thermoplastic adhesive material for converting said solid adhesive material to a molten state;
a source of gas;
means for agitating and pressurizing said molten adhesive in the presence of said gas so as to force said gas into solution with said molten adhesive;
means for dispensing said molten adhesive and gas solution at a pressure below the solution maintenance pressure of said solution whereby said gas is released from solution and forms an adhesive foam; and
means for selectively supplying additional gas to said agitating and pressurizing means during interrupted operation of said dispensing means so that the density of said adhesive foam created by said apparatus is maintained at a substantially constant value.

17. A method for controlling the uniformity of dispensed hot melt thermoplastic foamed adhesive including the steps of:
heating solid thermoplastic adhesive material for converting the solid adhesive material to a molten state;
providing a source of gas;
agitating and pressurizing the molten adhesive in the presence of the gas so as to force the gas into solution with the molten adhesive;
dispensing the molten adhesive and gas solution at a pressure below the solution maintenance pressure of the solution whereby the gas is released from solution and forms an adhesive foam; and
selectively supplying additional gas to the solution of molten adhesive and gas during interruptions in dispensing so that the density of the adhesive foam created is maintained at a substantially constant value.

18. Apparatus for controlling the uniformity of dispensed foamed adhesive comprising:
means for supplying gas;
means for agitating and pressurizing adhesive in the presence of said gas so as to force said gas into solution with said adhesive;
means for dispensing said adhesive and gas solution at a pressure below the solution maintenance pressure of said solution whereby said gas is released from solution and forms an adhesive foam; and
means for selectively controlling said gas supplying means during interrupted operation of said dispensing means so that only sufficient additional gas is supplied to said agitating and pressurizing means to maintain the density of said adhesive foam at a substantially constant value.

19. A method for controlling the uniformity of dispensed foamed adhesive including the steps of:
providing a supply of gas;
agitating and pressurizing adhesive in the presence of the gas so as to force the gas into solution with the adhesive;
dispensing the adhesive and gas solution at a pressure below the solution maintenance pressure of the solution whereby the gas is released from solution and forms an adhesive foam; and
selectively supplying additional gas to the solution of adhesive and gas during interruption in dispensing so that only sufficient gas is supplied to the solution to maintain the density of the adhesive foam at a substantially constant value.

* * * * *